Patented Nov. 21, 1922.

1,436,618

UNITED STATES PATENT OFFICE.

CHARLES ELIHU WELLES, OF PHELAN, CALIFORNIA.

FIRE-RESISTING COMPOSITION.

No Drawing.   Application filed May 31, 1922.   Serial No. 565,018.

*To all whom it may concern:*

Be it known that I, CHARLES ELIHU WELLES, a citizen of the United States, residing at Phelan, in the county of San Bernardino and State of California, have invented a new and useful Fire-Resisting Composition, of which the following is a specification.

The object of my invention is the production of a composition in liquid form which said composition when mixed with oil paint, viz., ordinary house paint, makes the paint fire-resistant.

My composition consists of a mixture of zinc-oxide (dry white zinc), air slacked lime, linseed oil, kerosene oil, water, 30° to 35° Baumé soluble glass (sodium silicate) and molasses.

In preparing the composition I prefer to use the ingredients in about the following proportions:

2 pounds of zinc oxide, 2 pounds air slacked lime, 1 qt. linseed oil, 1 pint water, 1 pint kerosene, 4 oz. (ounces) 30° Baumé to 35° Baumé soluble glass, 2 ounces molasses.

These ingredients are mixed as follows:

1st. Mix the dry zinc and lime together.

2d. Mix the linseed oil, water and kerosene together.

3d. Grind these two mixtures in a paint mill putting in the dry mixture first and adding the oil or No. 2 mixture a little at a time until thoroughly mixed, then add the 4 oz. soluble glass and 2 oz. molasses. Use 1 qt. of this mixture to 1 gallon of oil paint.

I claim:

A liquid composition consisting of from 1 to 2 pounds zinc oxide, 1 to 2 pounds air-slacked lime, 1 qt. linseed oil, 1 pt. water, 1 pint kerosene, 2 to 4 oz. 30° Baumé to 35° Baumé soluble glass and 1 to 2 oz. molasses.

CHARLES ELIHU WELLES.